Feb. 13, 1945.  G. E. MARX  2,369,361
TOOL STRUCTURE FOR TWO-WAY PLANING
Filed July 3, 1943
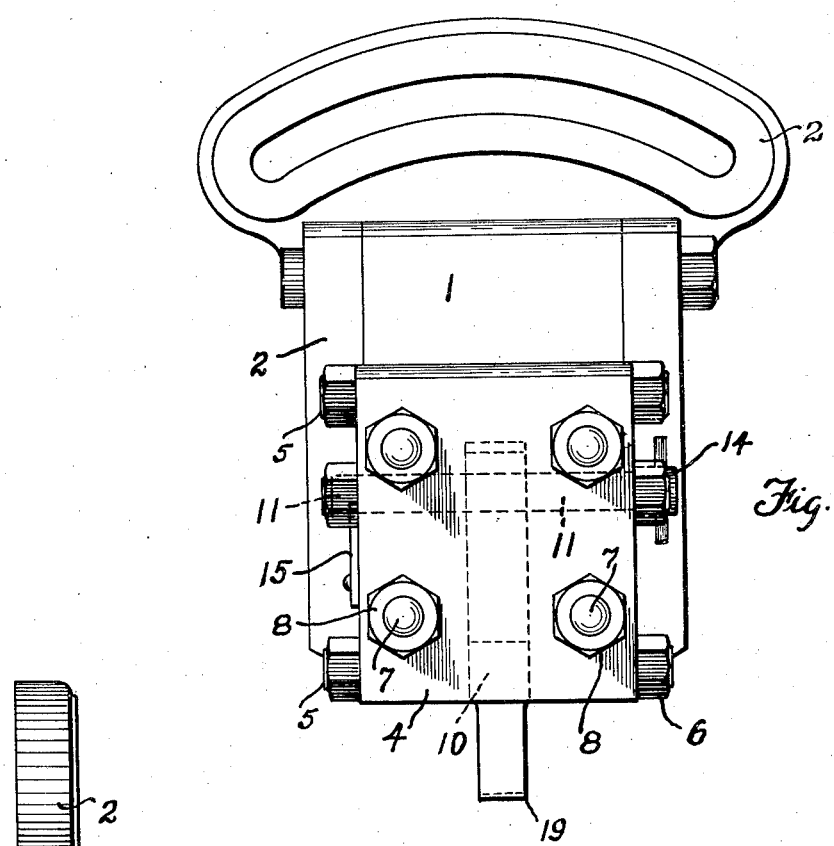
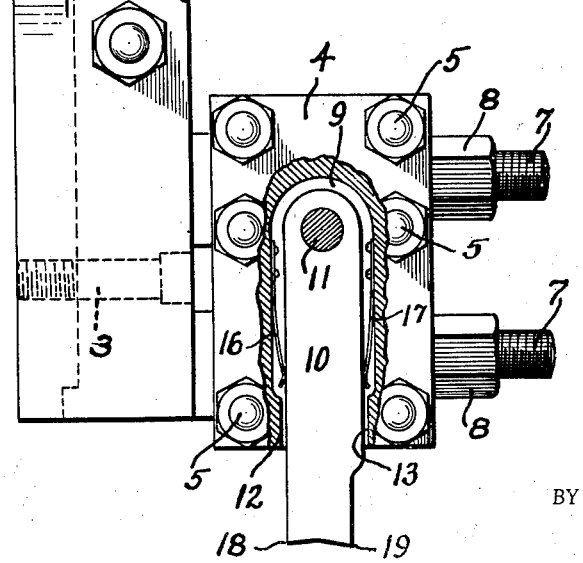
GRAHAM E. MARX.
INVENTOR.
BY Allen & Allen
Attorneys

UNITED STATES PATENT OFFICE 2,369,361

TOOL STRUCTURE FOR TWO-WAY PLANING

Graham E. Marx, Cincinnati, Ohio, assignor to The G. A. Gray Company, Cincinnati, Ohio, a corporation of Ohio Application July 3, 1943, Serial No. 493,414

8 Claims. (Cl. 90—53)

The primary object of my invention is to provide a tool structure which will permit two-way planing in ordinary metal planers. As is well known, the work is fastened to a planer table which is moved along a bed in feed and reverse strokes. Suitable uprights support a rail above the table, and the rail is adjustable vertically. A rail head or ram is adjustable longitudinally of the rail; and in ordinary planing operations the tool is mounted on the clapper of a clapper box affixed to the rail head or ram. The clapper and clapper box coact to support the tool in cutting position on one of the strokes of the table; but when the table reverses, the clapper being a pivoted structure, allows the tool to deflect and ride on the work. Thus the return stroke is an idle stroke. It is an object of my invention to provide a tool and mounting such that each stroke of the table may be a work stroke, and so that the productive capacity of the planer is very greatly increased.

Because, in the normal operation described above, only alternate strokes of the table are utilized for cutting, the conventional planer is provided with feeding means effective to feed the tools to the work at the start of each alternate stroke. Another object of the present invention is to provide a tool and mounting therefor which will be effective in producing cuts on the work upon each stroke of the planer table but with a feeding operation on each alternate stroke.

I am aware of the copending application of John M. Walter on Apparatus and method for planing, Serial No. 487,611 filed May 19, 1943, now Patent No. 2,358,897, issued September 26, 1944.

Yet another of the objects of this invention is to provide a simplified construction employing a single tool in a simple tool holder block whereby the objects recited above can be more simply attained.

These and other objects of my invention which will be set forth hereinafter or will be apparent to one skilled in the art upon reading this specification, I accomplish by that certain construction and arrangement of parts of which I shall now describe an exemplary embodiment. Reference is had to the accompanying drawing, wherein:

Figure 1 is a vertical elevation of a structure embodying my invention.

Figure 2 is a side elevation thereof with certain parts shown in section.

The tool block and tool which I shall hereinafter describe may be attached directly to the rail head or ram of a planer. It can also be attached to a post or column affixed to the rail head or ram, and since this post may have various dimensions and shapes, and since my structure can be attached in various orientations, it will be evident that my structure may be employed for angular and vertical planing as well as for horizontal planing. In the exemplary embodiment which I shall describe, my structure is shown as attached to the clapper 1 of a clapper box 2 which in turn is attached to a rail head or ram (not shown). When my device is attached to a clapper, the clapper will be rendered inoperative by being bolted down or otherwise fastened as at 3 in Figure 2.

In essence, my structure involves a tool block indicated generally at 4. The block may be a single unitary structure or it may be made up of parts or layers which are held together by a series of bolts 5 and nuts 6. The block as such is held to the clapper, clapper box, rail head, column or other support by bolts 7 and nuts 8 so as to be rigid with respect to the support. The tool block 4 has a central recess 9 in which a tool 10 is pivotally mounted. The upper end of the tool is preferably rounded; and the tool and block are both perforated for the reception of a pivot pin 11 whereby the tool, near its upper end, is pivoted in the recess. The recess is configured to the sides of the tool so as to avoid play or sideslip. Adjacent the lower end of the block where the tool emerges therefrom, I form abutment surfaces 12 and 13 so spaced and configured as to allow a limited rocking motion of the tool about the pivot pin 11. This rocking motion is not large in amplitude and, while it may be considerably varied, it will not usually be more than, say, about 10°. The pivot pin 11 may be provided with a head 14 to facilitate its removal, and with a lock 15 fastened to the block and engaging a groove in the pin to prevent its accidental removal. The recess 9, elsewhere than at the abutment faces 12 and 13, is made larger to accommodate resilient means tending to keep the tool centered between the abutment faces. These resilient means may be leaf spring members 16 and 17 fastened to the tool block and having ends bearing against the tool.

The tool has fore and aft cutting edges 18 and 19. When the table of the planer (not shown) is moving to the left in Figure 2, the cutting edge 19 will be in working position, because the tool will be tilted clockwise and supported in cutting position by the coaction of the pivot pin 11 and the abutment face 12. Similarly when the planer table is passing to the right in Figure 2, the tool 10 will be tilted in a counterclockwise direction and will abut the face 13, so that the cutting edge 18 will be in cutting position and will be operating upon the work.

Where, as is usual in metal planers, provision is made for feeding on each alternate stroke, I configure the cutting edges of my tool so that one of them will cut in a plane lower than the cutting plane of the other by the thickness of a desired cut. Thus, the cutting edge 19 may be located in a horizontal plane slightly lower than the cutting edge 18. The position and disposition of the cutting edges is related to the degree of tilting established by the abutment faces 12 and 13 as will be readily understood in the light of my teachings. The action of my tool is preferably automatic. The position of the cutting edges with reference to the median position is preferably so chosen that when the tool is properly fed, the work will engage it and tilt it to the proper position for cutting, the position depending upon the direction of relative motion of the work and tools. The tool 10 is renewable and replaceable upon withdrawal of the pivot pin 11. It may be a single, unitary and homogeneous metal tool, or it may be a tool having cutting faces and edges of harder material.

The making of the tool block 4 in three layers, the middle layer of which is substantially no thicker than the thickness of the tool 10 facilitates the forming of the recess 9, as will be understood. However, a unitary tool block can be formed by casting and machining. Modifications of structure are possible and, by way of example, it does not depart from the spirit of my invention to provide adjustable abutments in place of the fixed ones 12 and 13. Such abutments can be formed by means of set screws with suitable locking devices.

Other modifications may be made in my invention without departing from the spirit of it. Having thus described my invention, what I claim as new and desire to secure by Letters Patent is:

1. In combination, a tool block, an elongated tool having a single pivotal mounting with respect to the tool block near one of the tool ends, said tool having a medial position and cutting positions on each side thereof so located with respect to each other that the leading edge can contact the work at the start of a cutting stroke when said tool is in said median position, the other end of the tool being configured to form opposed cutting edges, abutment means on the tool block for engaging the tool and spaced to permit a limited swinging action of the tool on each side of said median position, so that either cutting edge may be brought into cutting position, and means for bringing said tool to said median position at the conclusion of a cutting stroke.

2. The structure claimed in claim 1, wherein the last mentioned means is resilient means for urging the tool to said median position, the coaction of the tool and work cut thereby, upon relative movement thereof, determining the cutting position of said tool.

3. The structure claimed in claim 1, wherein the tool is pivotally mounted in a recess formed in the said tool block, portions of the tool block walls adjacent said recess being configured to provide said abutments.

4. The structure claimed in claim 1, wherein the tool is pivotally mounted in a recess formed in the said tool block, portions of the tool block walls adjacent said recess being configured to provide said abutments, the means for bringing the tool to said median position being resilient means in said recess contacting said tool upon both sides.

5. The structure claimed in claim 1, in which the said opposed cutting edges of the said tool are located at different radial distances from the axis of the tool pivot.

6. The structure claimed in claim 1, in which the said opposed cutting edges of the said tool are located at different radial distances from the axis of the tool pivot, and in which the abutments bring said cutting edges into cutting positions upon pivoting of said tool, at different cutting depths.

7. The structure claimed in claim 1, wherein the tool is pivotally mounted in a recess formed in the said tool block, portions of the tool block walls adjacent said recess being configured to provide said abutments, the means for bringing said tool to said median position being resilient means in said recess contacting said tool upon both sides, and in which said opposed cutting edges are located at different radial distances from the pivot axis of said tool.

8. The structure claimed in claim 1, in which said tool block is made up of three pieces in face-to-face arrangement, the central piece being hollowed out to provide a recess for the acceptance of said tool, and to provide the said spaced abutments, the means for pivoting the tool comprising a pivot pin passing through said tool and the other portions of said block, the several portions of said block being rigidly fastened together.

GRAHAM E. MARX.